United States Patent [19]

Nakashima et al.

[11] Patent Number: 5,182,635
[45] Date of Patent: Jan. 26, 1993

[54] COLOR STILL PICTURE TRANSMISSION SYSTEM

[75] Inventors: Hisaharu Nakashima; Hiroyuki Hayasaki; Masami Suzuki, all of Gifu; Yoshinori Saito, Aichi; Hisasi Matuyama, Gifu, all of Japan

[73] Assignee: Sanyo Electric Co., Ltd., Osaka, Japan

[21] Appl. No.: 914,032

[22] Filed: Jul. 14, 1992

Related U.S. Application Data

[63] Continuation of Ser. No. 780,434, Oct. 11, 1991, abandoned, which is a continuation of Ser. No. 411,404, Sep. 22, 1989, abandoned.

[30] Foreign Application Priority Data

Oct. 6, 1988 [JP] Japan .................. 63-252384

[51] Int. Cl.⁵ .................. H04N 11/08; H04N 7/14
[52] U.S. Cl. .................. 358/12; 379/53
[58] Field of Search .................. 358/12, 13; 379/53

[56] References Cited

U.S. PATENT DOCUMENTS

| | | | |
|---|---|---|---|
| 4,319,267 | 3/1982 | Mitsuya et al. | 358/75 |
| 4,335,393 | 6/1982 | Pearson | 358/14 |
| 4,485,400 | 11/1984 | Lemelson et al. | 379/53 |
| 4,520,386 | 5/1985 | Asaida | 358/13 |
| 4,597,005 | 6/1986 | Baleshta et al. | 358/12 |
| 4,633,295 | 12/1986 | van de Polder et al. | 358/12 |
| 4,715,059 | 12/1987 | Couper-Hart et al. | 358/85 |
| 4,774,562 | 9/1988 | Chem et al. | 358/13 |
| 4,985,911 | 1/1991 | Emmons et al. | 379/53 |

FOREIGN PATENT DOCUMENTS

| | | |
|---|---|---|
| 052184 | 5/1982 | European Pat. Off. |
| 3042966 | 8/1982 | Fed. Rep. of Germany |
| 3005775 | 11/1982 | Fed. Rep. of Germany |
| 70718 | 6/1978 | Japan ............ 358/13 |

OTHER PUBLICATIONS

Hawkins, For-your-home video phones, Popular Science, vol. 232, No. 3 Mar. 1988.
Fischer, H. J.: Colour television still picture transmission via telephone lines. In: NTG Technical Report: Text and video communication, vol. 74, Berlin VDE-Verlag GmbH, pp. 298-304.
Niemeier, H.: A new method of transmitting and storing color television images. In: NTG Technical Report: Text and Video Communication, vol. 74, Berlin, VDE-Verlag GmbH, 1980, pp. 285-297.
Haberacker, P.: Digital Image Processing, 2nd edition, Munich, Carl Hanser Verlag, 1987, pp. 123-128.
Schonfelder, H.: Video Communication. Berlin, Springer-Verlag, 1983 pp. 132, 265-268.
Lohscheller, H.: Video still picture transmission via narrow band channels with resolution increasing with time. In: NTG Technical Report, vol. 74, 1980.
John Gosch, "System transmits color photos at monochrome speed", Electronics International, vol. 53, No. 11, May 8, 1980, pp. 77-78.
I.E.E.E. Transactions on Consumer Electronics "1988 International COnference on Consumer Electronics, Part 1" 34 (1988) Aug., No. 3, New York, NY, USA, pp. 759-767.

Primary Examiner—John W. Shepperd
Attorney, Agent, or Firm—Darby & Darby

[57] ABSTRACT

A color still picture transmission system includes color visible telephones which are coupled to each other through a telephone network. In succession to luminance signal data of all picture elements forming a whole screen, respective averaged values of two kinds of color difference signal data of four picture elements being adjacent to each other are sent from the color visible telephone at a sending party to the color visible telephone at a receiving party through the telephone network, a modem and a network control unit. In the color visible telephone at the receiving party, a monochromatic still picture is first displayed on a color CRT in accordance with the luminance signal data of all the picture elements which are precedingly received and stored in a video memory, and thereafter, the monochromatic still picture is sequentially changed to a color still picture by writing the same averaged color difference signal data in storage positions of the video memory corresponding to four picutre elements being adjacent to each other.

4 Claims, 5 Drawing Sheets

COLOR STILL PICTURE TRANSMISSION SYSTEM

This is a continuation of application Ser. No. 07/780,434, filed Oct. 11, 1991, which is a continuation of application Ser. No. 07/411,404, filed Sep. 22, 1989 now abandoned.

BACKGROUND OF THE INVENTION

1. Field of the Invention

The present invention relates to a color still picture transmission system. More specifically, the present invention relates to a color still picture transmission system in which luminance signal data and two kinds of color difference signal data of a color still picture is transmitted between color visible telephones, for example, by using a communication line such as a subscriber's line.

2. Description of the Prior Art

In the Japanese Patent Application Laying-open No. 154887/1980 laid-open on Dec. 2, 1980, a color still picture transmission system capable of transmitting a color still picture in a relatively short time period is disclosed. In this prior art, a luminance signal Y and color difference signals I and Q of a color picture taken by a color TV camera are respectively converted into PCM digital data. At this time, the I and Q signals are digitally converted with a converting cycle of 1/6 of the converting cycle for the Y signals. The digital data of the Y, I and Q signals are stored in a memory. The Y signal data are read from the memory during a period equal to three lines, and thereafter, the I signal data and the Q signal data which are band-reduced to 1/6 are continuously read from the memory during a period equal to one line of the Y signal data, being transmitted. At the receiving party, respective data of the Y signal, and the I signal and the Q signal which are sent from the sending party are written in a memory. After that the Y signal data of three lines are read from the memory, the I signal data and the Q signal data which are band-reduced to 1/6 are continuously read from the memory, respectively, during a period equal to three lines of the Y signal data.

In accordance with this prior art, since a color still picture can be transmitted in a transmission time period of approximately 4/3 of a time period necessary for transmitting a monochromatic still picture, there is an advantage that substantial shortening of the transmission time can be expected in comparison with a case where the digital data of the Y, I and Q signals are transmitted for each picture element.

However, in the above described prior art, since the I signal and the Q signal of a single picture element are merely sampled at every six picture elements of the Y signal, there is a disadvantage that such color difference signal data is susceptible to a sampling noise. The reason is that if a noise accidentally exists in the color difference signal in sampling the same, the noise level is undesirably sampled and thus the noise level is deemed as a correct value of the I signal or Q signal.

In addition, in the above described prior art, since the data of the Y, I and Q signals are transmitted from the sending party every three lines, there is a further disadvantage that a long time is required until a whole screen is completely displayed at the receiving party.

SUMMARY OF THE INVENTION

Therefore, it is a principal object of the present invention is to provide a color still picture transmission system in which a transmission time can be shortened and influence of a sampling noise can be reduced.

The other object of the present invention is to provide a color still picture transmission system in which a still picture can be quickly grasped in whole at a receiving party.

A color still picture transmission method in accordance with the present invention comprises the following steps of: (a) converting a color video signal of a color still picture taken by a color TV camera into luminance signal data and two kinds of color difference signal data; (b) transmitting the luminance signal data of all picture elements forming a whole screen; (c) transmitting the two kinds of color difference signal data after said step (b) through reduction of the same to 1/N (N is an integer of 2 or more); and (d) at a receiving party, after that a monochromatic still picture is displayed in accordance with the luminance signal data of all the picture elements which are precedingly received, changing said monochromatic still picture to a color still picture in accordance with the two kinds of color difference signal data.

In accordance with the present invention, the two kinds of color difference signal data which are respectively band-reduced are transmitted after that the luminance signal data of all the picture elements constituting the whole screen have been transmitted. Therefore, there is an advantage that not only the transmission time period becomes short but also the still picture can be quickly grasped in whole at the receiving party since a monochromatic still picture can be displayed in whole on the CRT prior to a color still picture at the receiving party. In this case, as a method for band-reducing the color difference signal data, it is possible to utilize a sampling method, averaging method or the like.

A further color still picture transmission method in accordance with the present invention comprises the following steps of: (a) converting a color video signal of a color still picture taken by a color TV camera into luminance signal data and two kinds of color difference signal data; (b) storing the luminance signal data and two kinds of the color difference signal data in a memory for each picture element; (c) calculating averaged values of the two kinds of color difference signal data for every N picture elements adjacent to each other (N is an integer of 2 or more) which are stored in the memory; (d) transmitting the averaged values of two kinds of color difference signal data succeedingly to the luminance signal data; and (e) at a receiving party, writing the luminance signal data in storage positions of a video memory corresponding to respective picture elements and the same averaged color difference signal data in storage positions of the video memory corresponding to N picture elements being adjacent to each other.

In accordance with the present invention, as similar to the previously cited prior art, in comparison with a case where the two kinds of color difference signal data are transmitted for each picture element of the whole screen, it is possible to shorten the transmission time period to 1/N. Furthermore, since the two kinds of color difference signal data to be transmitted are the averaged values of the respective color difference signal data of the adjacent N picture elements, in comparison with the previously cited prior art, it is possible to drastically reduce influence of a sampling noise. Because even if a sampling noise exists in a given picture element, the color difference signal data of that picture element is averaged together with the color difference signal data of the remaining N−1 picture elements, and therefore, a noise level thereof becomes very small and thus it is possible to drastically reduce influence of the sampling noise.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENTS

Figure 1:
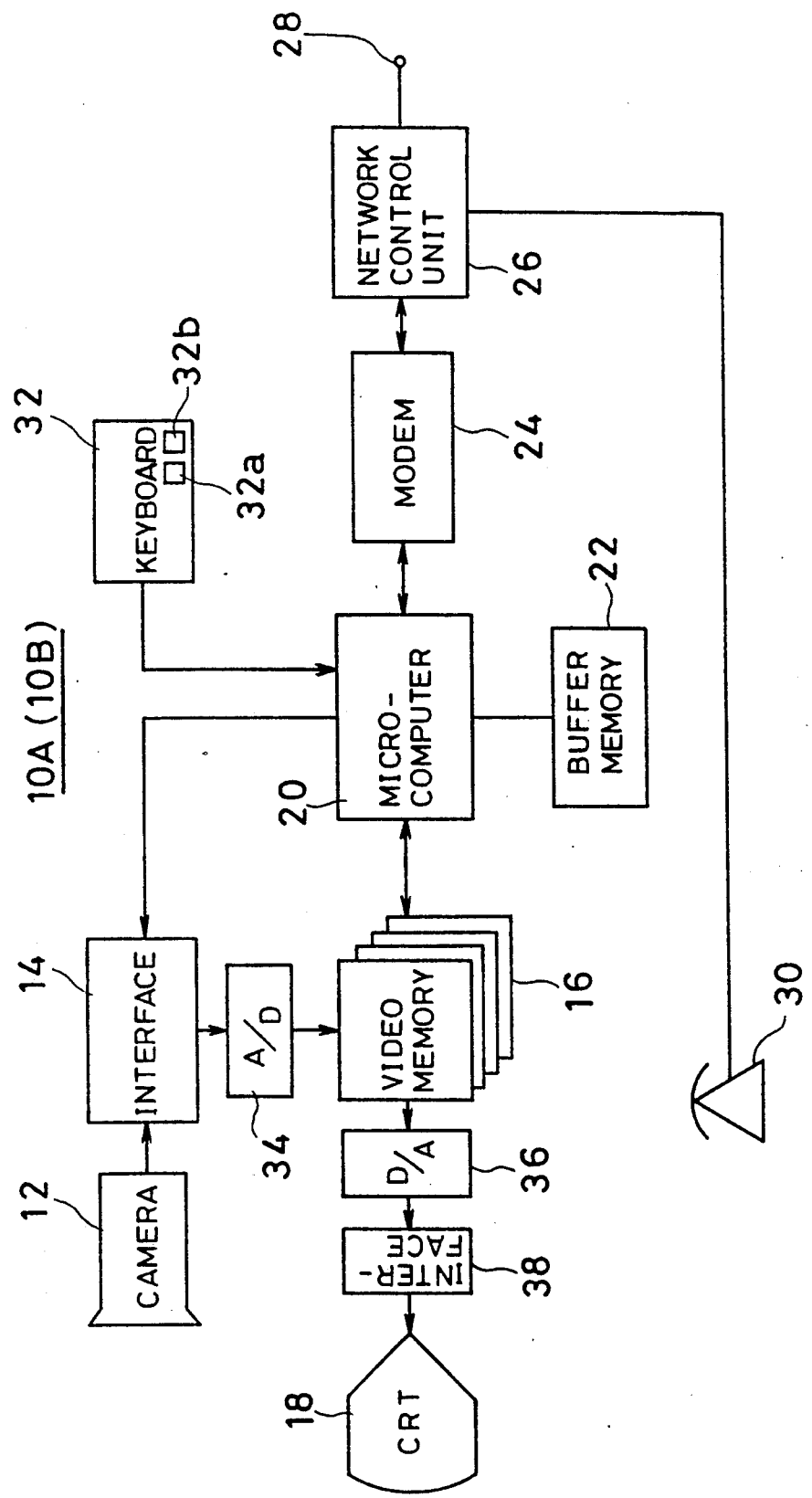
FIG. 1 is a block diagram showing one embodiment of the present invention.

With reference to FIG. 1, a color visible telephone 10A (10B) of this embodiment shown includes a color TV camera 12 which takes a person or the like that exists in front thereof and outputs a color video signal. The color video signal is inputted to an interface 14. In an A/D converter 34, the color video signal is converted into color signals R, G and B which are in turn converted into PCM digital data of 16 graduation levels which are represented by 4 bits for each picture element. Therefore, in a video memory 16, the PCM digital data of the color signals R, G and B are stored for each picture element.

The color signal data read from the video memory 16 are converted into analog signals in a D/A converter 36 and such analog signals are converted into a color video signal in an interface 38. Thus, a color picture is displayed on a color CRT 18 in accordance with the color signal data of the respective picture elements which are thus stored in the video memory 16.

In addition, in this embodiment shown, a whole screen of the color CRT 18 is formed by 90 picture elements in a horizontal direction and 90 picture elements (lines) in a vertical direction, that is, 90×90 picture elements.

A microcomputer 20 presides over controlling the whole of the color visible telephone 10A (10B) and, by using a buffer memory 22, calculates luminance signal data and two kinds of color difference signal data based upon the digital data of the color signals R, G and B which are read from the video memory 16. More specifically, in association with the microcomputer 20, there is provided with the buffer memory 22 which has storage positions corresponding to the picture elements of one line of the video memory 16, that is, 90 picture elements. In transmitting a color still picture, the buffer memory 22 temporarily stores the color signal data of the respective picture elements which are read from the video memory 16. On the other hand, in receiving a color still picture, the buffer memory 22 temporarily stores luminance signal data and two kinds of color difference signal data which are sent from the color visible telephone 10A at a sending party. In addition, in the color visible telephone 10B at a receiving party, the microcomputer 20 calculates respective data of the color signals R, G and B based upon the luminance signal data and the two kinds of color difference signal data which are stored in the buffer memory 22, and the data of the color signals thus calculated are written in the video memory 16 for each picture element.

A modem 24 modulates the luminance signal data and the color difference signal data outputted from the microcomputer 20 and outputs the same to a network control unit 26, or demodulates the luminance signal data and the color difference signal data which are modulated and inputted from the telephone network (subscriber line) 28 through the network control unit 26. Then, the network control unit 26 selectively connects the modem 24 or a sound telephone 30 to the telephone network 28.

The color visible telephone 10A (10B) further includes a keyboard 32 and key-input signals from the keyboard 32 is given to the microcomputer 20. The keyboard 32 includes, as similar to a normal telephone, a ten-key and other key, and the keyboard 32 further includes a key 32a for commanding fixing of a color picture and a key 32b for commanding transmission of a color still picture. More specifically, in a normal case, the color picture taken by the color TV camera 12 is displayed on the color CRT 18 as a moving picture; however, if the key 32a is operated, the color picture is fixed and becomes a color still picture.

Figure 2:
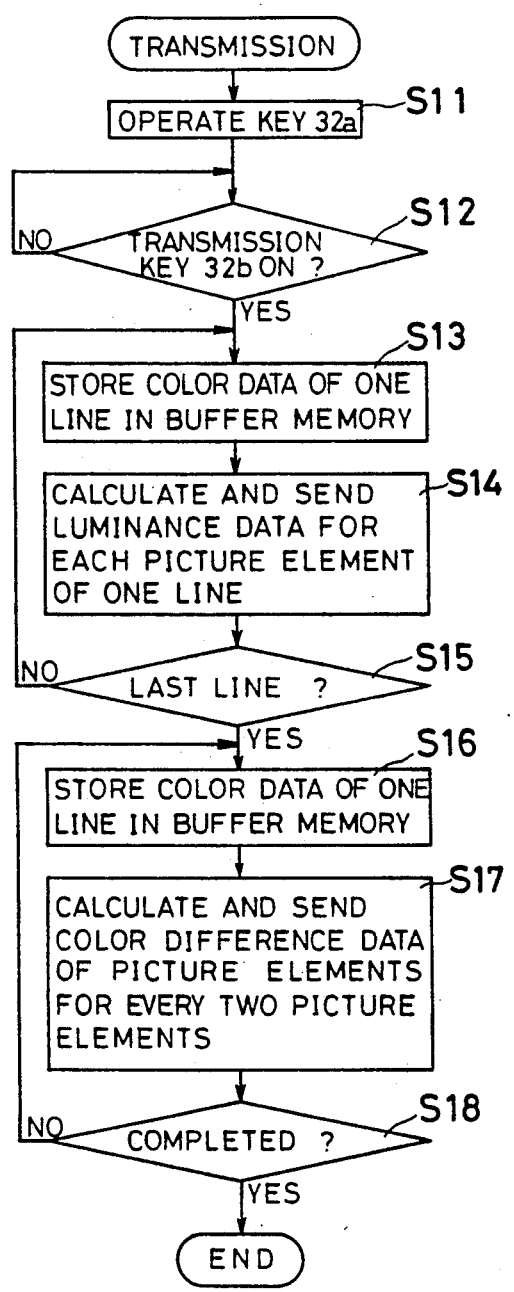
FIG. 2 is a flowchart showing a transmission mode of FIG. 1 embodiment.

Then, in the first step S11 of a transmission mode as shown in FIG. 2, in a state where the telephone network 28 is established between the two color visible telephones 10A and 10B, a user at the sending party operates the key 32a included in the keyboard 32. In response to a key-input signal of the key 32a, the microcomputer 20 inhibits the video memory 16 from being re-written thereafter. Therefore, at a time point when the key 32a is operated, the content of the video memory 16 is fixed. In other words, at this time point, the digital data of the color signals R, G and B of the color still picture are fixedly stored in the video memory 16.

If the transmission key 32b included in the keyboard 32 is operated in the step S12 of FIG. 2, in the next step S13, the color signal data of the all the picture elements of one line are read from the video memory 16 and stored in the buffer memory 22.

In the next step S14, the microcomputer 20 reads the color signal data of all the picture elements of one line from the buffer memory 22 and approximately calculates luminance signal data Y in accordance with the following equation (1) based upon the color signal data as read.

$$Y = 0.3R + 0.59G + 0.11B$$

$$Y = (3R + 6G + B)/10 \tag{1}$$

Each of the luminance signal data thus calculated is represented as PCM data of 4 bits.

Then, in the same step S14, the luminance signal data Y thus calculated are sent to the telephone network 28 through the modem 24 and the network control unit 26.

The steps S13 and S14 are repeatedly executed until the last line of the whole screen is detected by the microcomputer 20 in the step S15. Therefore, when "YES" is determined in the step S15, the luminance signal data Y of all the picture elements of the whole screen become to have been transmitted from the color visible telephone 10A at the sending party to the color visible telephone 10B at the receiving party.

Next, in the step S16, the color signal data of one line (90 picture elements) are read from the video memory 16 and stored in the buffer memory 22. Then, in the step S17, the microcomputer 20 reads the color signal data of 90 picture elements being stored in the buffer memory 22 at every two picture elements and thus 45 picture elements in total and at every reading, the microcomputer 20 calculates two kinds of color difference signal data R−Y and B−Y in accordance with the following equations (2) and (3).

$$R-Y = R - (3R+6G+B)/10 \quad (2)$$

$$B-Y = B - (3R+6G+B)/10 \quad (3)$$

The color difference signal data R−Y and B−Y are also represented as PCM data of 4 bits, respectively.

The two kinds of color difference signal data R−Y and B−Y of 45 picture elements thus calculated are sent from the modem 24 and the network control unit 26 to the telephone network 28.

The steps S16 and S17 are repeatedly executed until the last line of the whole screen is detected by the microcomputer 20 in the step S18.

Figure 3:
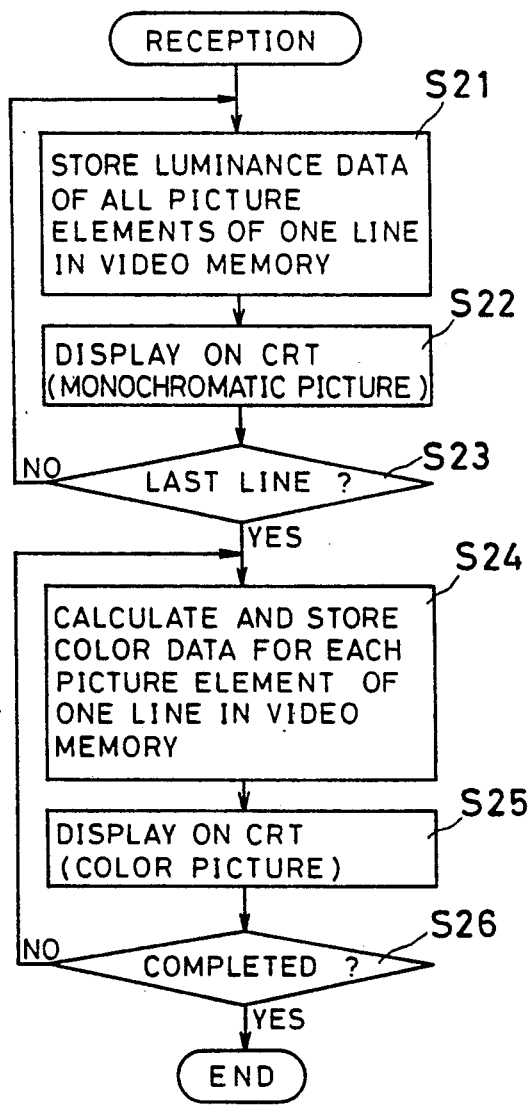
FIG. 3 is a flowchart showing a reception mode of FIG. 1 embodiment.

In a reception mode as shown in FIG. 3, at the first step S21, the microcomputer 20 stores the luminance signal data Y for each line which are received through the telephone network 28, network control unit 26 and modem 24 in the buffer memory 22. The luminance signal data Y are sequentially read from the buffer memory 22 and written in the storage positions of the video memory 16 which correspond to respective picture elements one by one line. Therefore, in the step S22, a monochromatic still picture is displayed on the color CRT 18. Then, the steps S21 and S22 are repeatedly executed until the last line of the whole screen is detected by the microcomputer 20 in the step S23. Therefore, at a timing when the step S23 is completed, the monochromatic still picture is displayed in whole on the color CRT 18.

Next, in the step S24, the microcomputer 20 calculates color signal data R, G and B in accordance with the following equations (4), (5) and (6) based upon the two kinds of color difference signal data R−Y and B−Y of 45 picture elements for each line and the received luminance signal data Y, and stores the same in the storage positions of the video memory 16 corresponding to the picture elements.

$$R = Y + (R-Y) \quad (4)$$

$$B = Y + (B-Y) \quad (5)$$

$$G = (10Y - 3R - B)/6 \quad (6)$$

However, as to the picture elements for each of which only the luminance signal data is stored in the buffer memory 22, that is, the picture elements being even-numbered, color signal data $R_i$, $G_i$ and $B_i$ are calculated in accordance with the following equations (7), (8) and (9) wherein "i" is an integer of the even number, "i−1" indicates an odd number before the same, and "i+1" indicates an odd number after the same.

$$R_i = (R_{i-1} + R_{i+1})/2 \quad (7)$$

$$B_i = (B_{i-1} + B_{i+1})/2 \quad (8)$$

$$G_i = (10Y_i - 3R_i - B_i)/6 \quad (9)$$

Thus, in accordance with the color signal data R, B and G, and $R_i$, $B_i$ and $G_i$ which are written in the storage positions of the video memory 16 corresponding to the respective picture elements in the step S24, in the step S25, the monochromatic still picture which has been displayed in whole on the color CRT 18 is sequentially changed into a color still picture.

Then, the steps S24 and S25 are repeatedly executed until the microcomputer 20 detects the completion of the whole screen in the step S26. Therefore, at the timing when the step S26 is completed, a color still picture becomes to be displayed in whole on the color CRT 18.

In accordance with this embodiment, it is possible to considerably shorten the transmission time period. More specifically, in a case where color signal data R, G and B are transmitted as to all the picture elements of the whole screen (90×90 picture elements), it is necessary to transmit the data of 97,200 (=4×90×90×3) bits; however, when only the luminance signal data Y and the two kinds of color difference signal data R−Y and B−Y being thinned out every two picture elements are transmitted in accordance with this embodiment, it is necessary to transmit the data of only 64,800 (=4×90×90+4×45×90×2) bits, and therefore, in comparison with the former case, the transmission time period reduced to ⅔. Furthermore, if in accordance with this embodiment, the luminance signal data of all the picture elements of the whole screen are transmitted from the color visible telephone 10A at the sending party to the color visible telephone 10B at the receiving party prior to sending of the color difference signal data, the monochromatic still picture is first displayed in whole on the color CRT 18 of the color visible telephone 10B at the receiving party, and therefore, there is an advantage that the user at the receiving party can quickly grasp the still picture in whole.

In addition, in the above described embodiment, the two kinds of color difference signal data are respectively band-reduced to ½ and transmitted. However, it is possible to arbitrarily select a value of 2 or more by which a required picture quality can be satisfied as the degree of the band-reduction, that is, "N". Therefore, the value of "N" may be set as "6" as in the previously cited prior art.

Figure 4:
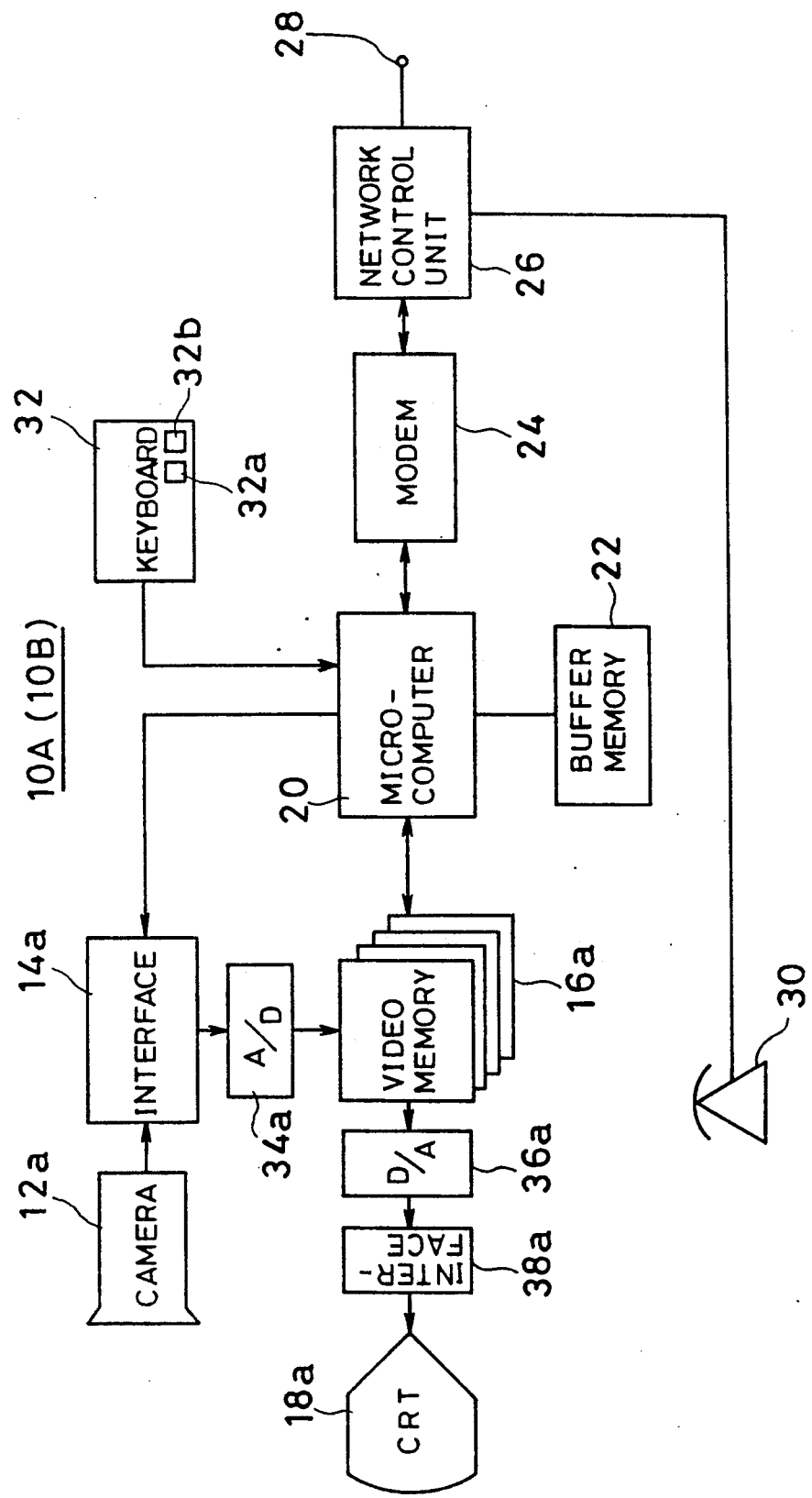
FIG. 4 is a block diagram showing the other embodiment of the present invention.

In the other embodiment as shown in FIG. 4, a function of an interface 14a is changed in comparison with the interface 14 of FIG. 1 embodiment. More specifically, in this embodiment, the color video signal which is inputted from a color TV camera 12a is converted into a luminance signal Y and two kinds of color difference signal (R−Y) and (B−Y) in the interface 14a. Then, these signals are converted into PCM codes (digital data) each of which is represented by 4 bits, respectively, in an A/D converter 34a. Therefore, the luminance signal data Y and the two kinds of the color difference signal data R−Y and B−Y are stored in the storage positions of a video memory 16a corresponding to the respective picture elements. Then, each of the luminance signal data Y and the color difference signal data R−Y and B−Y which are read from the video memory 16a is converted into an analog signal by a D/A converter 36a and, in an interface 38a, the color video signal is reproduced based upon these analog signals. Therefore, in the previous embodiment, the microcomputer 20 calculates the luminance signal data Y and the two kinds of color difference signal data R−Y and B−Y; however, no calculation is required in this embodiment.

In addition, in this embodiment, the whole screen of a color CRT 18a is constituted by 160 picture elements in a horizontal direction and 100 picture elements (lines) in a vertical direction, that is, 160×100 picture elements.

Figure 5:
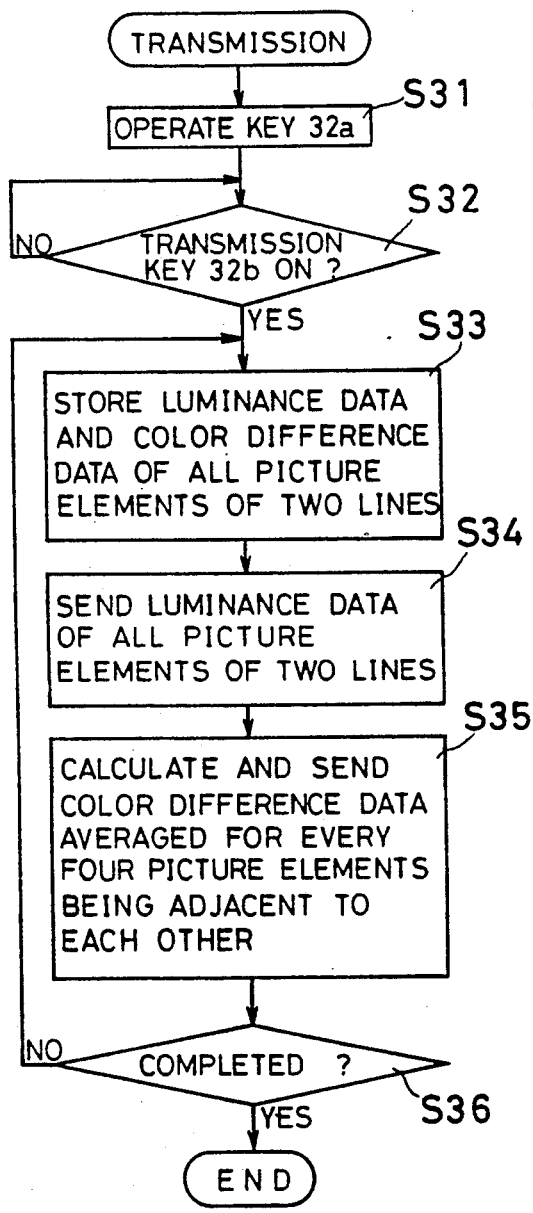
FIG. 5 is a flowchart showing a transmission mode of FIG. 4 embodiment.

In the first step S31 of a transmission mode shown in FIG. 5, if the key 32a of the keyboard 32 is operated in a state where the telephone network 28 is established between the color visible telephone 10A at the sending party and the color visible telephone 10B at the receiving party, the luminance signal data and the two kinds of the color difference signal data of the color picture which is taken by the color TV camera 12a are fixedly stored in the storage positions of the video memory 16a which are correspond to the respective picture elements. Then, if the transmission key 32b of the keyboard 32 is operated in the step S32, the luminance signal data and the two kinds of color difference signal data of two lines are read from the video memory 16 and stored in the buffer memory 22.

Then, the microcomputer 20 reads and sends the luminance signal data of two lines being stored in the buffer memory 22 onto the telephone network 28 through the modem 24 and the network control unit 26.

Next, in the step S35, the microcomputer 20 calculates averaged values of the two kinds of color difference signal data (R−Y) and (B−Y) of two lines being stored in the buffer memory 22. In other words, the microcomputer 20 calculates the averaged values of the color difference signal data of four picture elements (two picture elements in the horizontal direction and two picture elements in the vertical direction) of two lines which are adjacently stored in the buffer memory 22. The averaged color difference signal data thus calculated are sent onto the telephone network 28 through the modem 24 and the network control unit 26. Such calculation and transmission process are repeatedly executed for all the picture elements of two lines being stored in the buffer memory 22. Thus, two kinds of the color difference signal data are respectively band-reduced to ¼ and transmitted.

The above described steps S33–S35 are repeatedly executed until the microcomputer detects the completion of the whole screen in the step S36. Then, if "YES" is determined in the step S36, the microcomputer 20 controls the network control unit 26 so as to connect again the telephone network 28 to the sound telephone 30.

Figure 6:
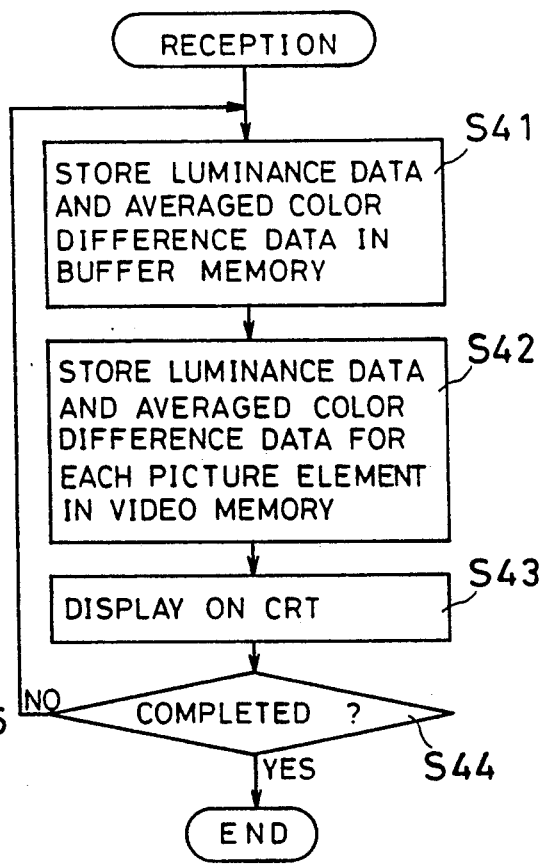
FIG. 6 is a flowchart showing a reception mode of FIG. 4 embodiment.

In a reception mode as shown in FIG. 6, at the step S41, the microcomputer 20 of the color visible telephone 10B at the receiving party stores the luminance signal data of all the picture elements of two lines and the averaged color difference signal data being band-reduced to ¼ which are received and demodulated through the telephone network 28, network control unit 26 and modem 24 in the buffer memory 22. Next, in the step S42, the luminance signal data of all the picture elements of two lines being stored in the buffer memory 22 are read and written into the video memory 16a and the averaged color difference signal data are written in the storage positions of the video memory 16a corresponding to the four picture elements being adjacent to each other. In other words, in the video memory 16a, the same averaged color difference signal data are written in the storage positions corresponding to four picture elements (two picture elements in the horizontal direction and two picture elements in the vertical direction) which are adjacent to each other.

In the step S43, the microcomputer 20 reads all the luminance signal data and the color difference signal data of two lines from the video memory 16a, and thus, in the step S43, a color still picture of two lines is displayed on the color CRT 18a.

The above described steps S41–S43 are repeatedly executed until the completion of the whole screen is detected by the microcomputer 20 in the step S44.

Figure 7:
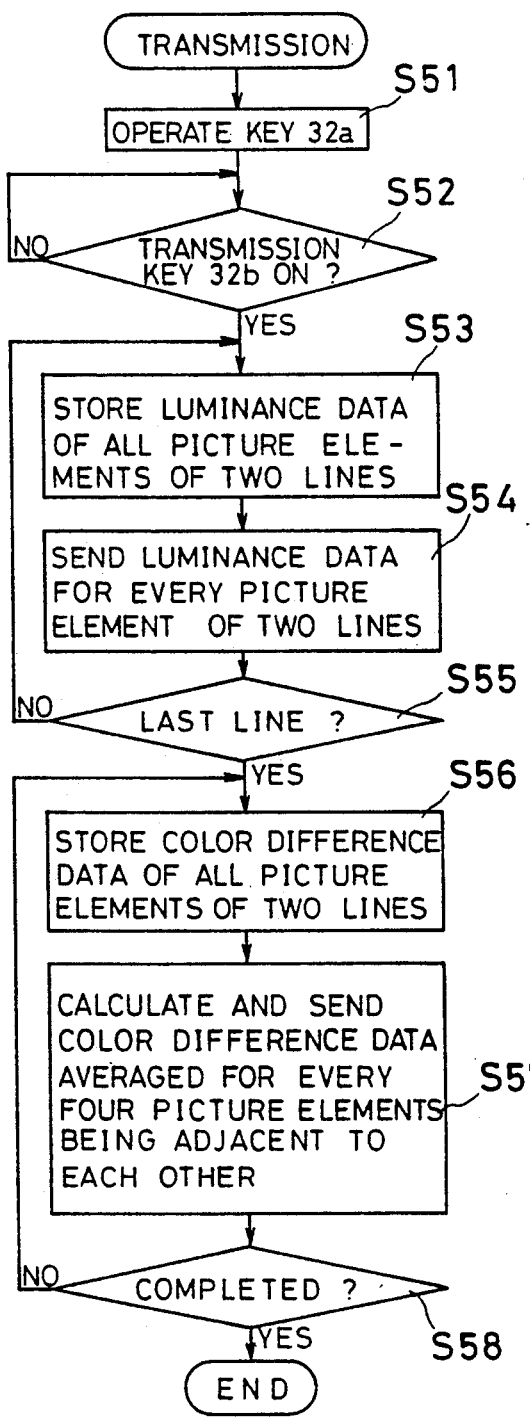
FIG. 7 is a flowchart showing a further transmission mode of FIG. 4 embodiment.
Figure 8:
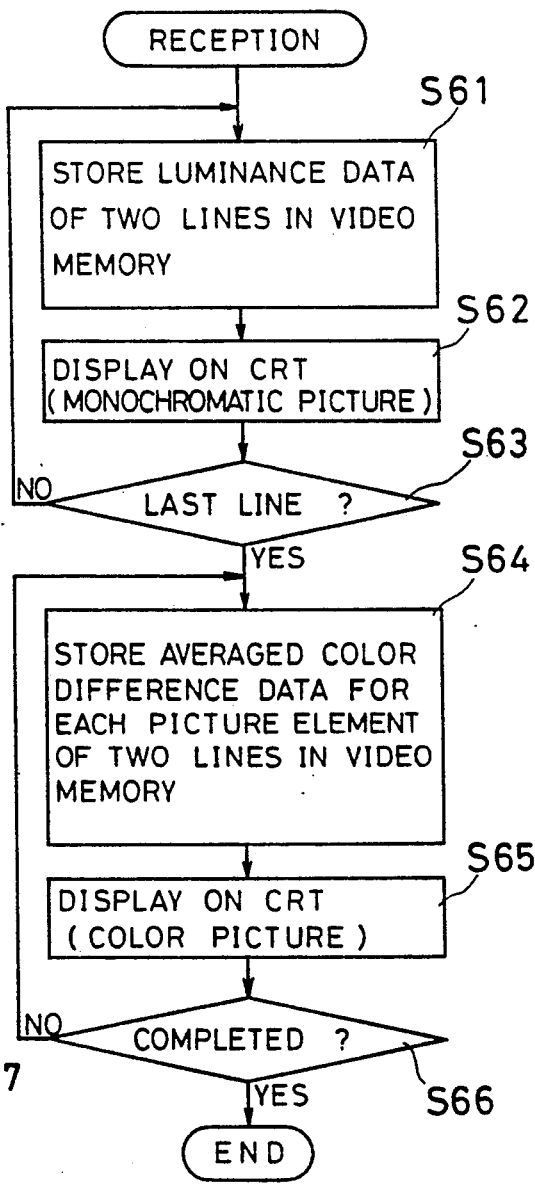
FIG. 8 is a flowchart showing a further reception mode of FIG. 4 embodiment.

The embodiment shown in FIG. 5 and FIG. 6 may be modified as shown in FIG. 7 and FIG. 8. In the embodiment shown in FIG. 7 and FIG. 8, as similar to the embodiment shown in FIG. 2 and FIG. 3, the two kinds of color difference signal data are sequentially sent after that the luminance signal data of all the picture elements forming the whole screen have been transmitted.

More specifically, after that the steps S51 and S52 which are the same as the steps S31 and S32 of FIG. 5 are executed, as similar to the step S33, in the step S53, the microcomputer 20 of the color visible telephone 10A at the sending party reads the luminance signal data of all the picture elements of two lines being stored in the video memory 16 to write the same in the buffer memory 22. Then, in the step S54, the luminance signal data of the respective picture elements are sent from the buffer memory 22 to the telephone network 28. Then, the steps S53 and S54 are repeatedly executed until the last line of the whole screen is detected by the microcomputer 20 in the step S55.

Then, in the step S56, the microcomputer 20 reads the two kinds of color difference signal data of two lines being stored in the video memory 16a to store the same in the buffer memory 22. In the step S57, as similar to the previous step S35, the microcomputer 20 calculates the averaged color difference signal data and sends the same onto the telephone network 28. Then, the steps S56 and S57 are repeatedly executed until the completion of the whole screen is detected by the microcomputer 20 in the step S58.

In the first step S61 of a reception mode as shown in FIG. 8, the microcomputer 20 of the color visible telephone 10B at the receiving party writes the luminance signal data of all the picture elements of two lines which are received through the telephone network 28 in the video memory 16a via the buffer memory 22. Therefore, in the step S62, a monochromatic still picture is displayed on the color CRT 18. Then, the steps S61 and S62 are repeatedly executed until the last line of the whole screen is detected by the microcomputer 20 in the step S63. Therefore, when "YES" is determined in the step S63, a monochromatic still picture is displayed in whole on the color CRT 18a of the color visible telephone 10B at the receiving party.

Then, in the step S64, the averaged color difference signal data which are received through the telephone network 28 are written in the storage positions of the video memory 16a corresponding to the respective picture elements. Therefore, in the step S65, the monochromatic still picture which is previously displayed in whole on the color CRT 18 is sequentially changed to a color still picture. The steps S64 and S65 are repeatedly executed until "YES" is determined in the step S66.

Thus, in the embodiment shown in FIG. 7 and FIG. 8, the monochromatic still picture is first displayed in whole on the color CRT 18a of the color visible telephone 10B at the receiving party, and thereafter, the monochromatic still picture is sequentially changed to the color still picture.

In addition, in the embodiments shown in FIG. 5 and FIG. 7, the averaged color difference signal data is obtained for every four picture elements which are adjacent to each other in the horizontal and the vertical directions and thus has a correlative relationship therebetween; however, the number of the picture elements based upon which the averaged color difference signal data is calculated may be an arbitrary value of 2 or more. In other words, in the embodiments, a ratio "N" by which the color difference signal data is band-reduced can be selected arbitrarily. In addition, the N picture elements may be arranged in a single line in the horizontal direction.

In addition, in order to band-reduce the color difference signal data, other than the above described averaging method, a method for sampling the color difference signal data at every N picture elements, or a method for selecting the representative value of the N picture elements, or the like may be utilized.

Furthermore, in all of the above described embodiments, as the color difference signal data, $R-Y$ and $B-Y$ are utilized; however, instead of $R-Y$ or $B-Y$, a color difference signal $G-Y$ may be utilized. In addition, as such a color difference signal, approximate color difference signal data is utilized; however, as similar to the NTSC television standard, I signal and Q signal which are adjusted in phase may be utilized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for transmitting a color still picture in a video telephone system, comprising the steps of:
   (a) converting a color image taken by a color video camera into a luminance signal and color difference signals;
   (b) analog to digital converting the luminance signal and the color difference signals into luminance signal data and color difference signal data, respectively;
   (c) storing the luminance signal data and the color difference signal data of at least one screen in a video memory;
   (d) displaying a color moving picture on the basis of the data read from the video memory;
   (e) inhibiting the data stored in the video memory from being altered in response to an operation of a first key input means;
   (f) transmitting the luminance signal data of one screen read from the video memory onto a telephone line through a modem in response to an operation of a second key input means;
   (g) reading the color difference signal data of a plurality of lines from the video memory and temporarily storing the color difference signal data of the plurality of lines in a buffer memory means;
   (h) calculating average data of the color difference signal data of a plurality of adjacent picture elements on the basis of the color difference signal data being temporarily stored in the buffer memory means for each of the color difference signals;
   (i) transmitting the average data for each of the color difference signals of the plurality of lines onto the telephone line through the modem;
   (j) repeating the steps (g)-(i) until the completion of the transmission of all the lines of one screen; and
   (k) connecting the telephone line to a speech telephone in response to a detection of the completion of transmission of the average data of one screen.

2. A method in accordance with claim 1, further comprising a step of (k) at a receiving party, writing the luminance signal data of respective picture elements being transmitted in a video memory, and writing the same average data in the plurality of adjacent picture elements in the video memory.

3. A method in accordance with claim 1, wherein said step (f) includes steps of (f1) reading the luminance signal data of a plurality of lines from the video memory and temporarily storing the luminance signal data of the plurality of lines in a buffer memory means, (f2) transmitting the luminance signal data of the plurality of liens being temporarily stored in the buffer memory, and (f3) repeating the steps (f1) and (f2) until the completion of the transmission of all the lines of one screen.

4. A video telephone capable of transmitting a color still picture, comprising:
   a color video camera;
   an interface for converting a color image taken by the color video camera into a luminance signal and color difference signals;
   an analog to digital converter for analog to digital converting the luminance signal an the color difference signals into luminance signal data and color difference signal data, respectively;
   a video memory for storing the luminance signal data and the color difference signal data of at least one screen;
   a color display coupled to the video memory for displaying a color moving picture based upon the data read from the video memory;
   first key input means for acting on the video memory to inhibit the video memory from being altered;
   second key input means for commanding a start of transmission;
   a modem for modulating data to be transmitted;
   a network control circuit for selectively connecting a telephone line to anyone of the modem and a speech telephone;
   a buffer memory for receiving and temporarily storing the luminance signal data and the color difference signal data of a plurality of lines which are read from the video memory;
   first transmitting means for transmitting the luminance signal data of one screen read from the buffer memory onto the telephone line through the modem in response to an operation of the second key input means;
   calculating means coupled to the buffer memory for calculating average data of the color difference signal data of a plurality of adjacent picture elements on the basis of the color difference signal data being temporarily stored in the buffer memory means for each of the color difference signals; and second transmitting means coupled to the calculating means for sequentially transmitting the average data for each of the color difference signals of the plurality of lines onto the telephone line through the modem until the completion of the transmission of all the lines of one screen, said network control circuit connecting the telephone line to the speech telephone in response to a detection of the completion of transmission of the average data of one screen.

* * * * *